(12) United States Patent
Nzengung

(10) Patent No.: US 9,067,808 B2
(45) Date of Patent: Jun. 30, 2015

(54) TREATMENT OF PERCHLORATE AND OTHER EMERGING CONTAMINANTS IN WATER AND BRINES

(75) Inventor: Valentine A. Nzengung, Athens, GA (US)

(73) Assignee: MuniRem Environmental, LLC, Athens, GA (US)

( * ) Notice: Subject to any disclaimer, the term of this patent is extended or adjusted under 35 U.S.C. 154(b) by 0 days.

(21) Appl. No.: 11/280,760

(22) Filed: Nov. 15, 2005

(65) Prior Publication Data

US 2008/0116131 A1     May 22, 2008

Related U.S. Application Data

(60) Provisional application No. 60/627,683, filed on Nov. 15, 2004.

(51) Int. Cl.
| | |
|---|---|
| C02F 3/00 | (2006.01) |
| B01J 20/10 | (2006.01) |
| B01J 20/12 | (2006.01) |
| B01J 20/18 | (2006.01) |
| C02F 1/28 | (2006.01) |
| C02F 3/34 | (2006.01) |
| C02F 101/00 | (2006.01) |

(52) U.S. Cl.
CPC .................. *C02F 1/281* (2013.01); *B01J 20/10* (2013.01); *B01J 20/12* (2013.01); *B01J 20/186* (2013.01); *C02F 3/348* (2013.01); *C02F 2101/003* (2013.01); *C02F 2303/16* (2013.01); *C02F 2303/18* (2013.01)

(58) Field of Classification Search
USPC .............................. 210/601, 610–618; 502/20
See application file for complete search history.

(56) References Cited

U.S. PATENT DOCUMENTS

| | | | |
|---|---|---|---|
| 4,740,488 A | 4/1988 | Fogler et al. | |
| 4,916,095 A | 4/1990 | Fogler et al. | |
| 5,492,881 A * | 2/1996 | Diamond | ...................... 502/401 |
| 6,261,986 B1 | 7/2001 | Bowman et al. | |
| 6,423,533 B1 | 7/2002 | Gearheart et al. | |
| 6,531,065 B2 | 3/2003 | Gurol et al. | |
| 6,627,084 B2 | 9/2003 | Murphy et al. | |
| 6,881,348 B2 | 4/2005 | Cannon et al. | |

OTHER PUBLICATIONS

Nzengung, Organic Cosolvent Effects of Sorption Equilibrium of Hydrophobic Organic Chemicals by Organoclays, Environmental Science & Technology, 1996, vol. 30, U.S.A.
Nzengung, Organic Cosolvent Effects of Sorption Kinetics of Hydrophobic Organic Chemicals by Organoclays, Environmental Science & Technology, 1997, 31, 1470-1475, U.S.A.
O'Niell, In Situ Bioremediation of Perchlorate, Technical Resources, 2003, vol. 21, Issue 6, U.S.A.
Perchlorate Treatment Technology Update, Federal Facilities forum Issue Paper, May 2005, EPA 542-R-05-015, U.S.A.

(Continued)

*Primary Examiner* — Chester T. Barry
(74) *Attorney, Agent, or Firm* — White-Welker & Welker, LLC; Matthew T. Welker, Esq.

(57) ABSTRACT

Cost-effective tailored earth materials and methods of making and using these tailored earth materials are disclosed. These tailored earth materials can be used to treat (filter) emergent contaminants, such as perchlorate, from water or brine. The sorbed contaminants on the spent tailored earth materials can be degraded after use by bioremediation.

5 Claims, 15 Drawing Sheets

(56) References Cited

OTHER PUBLICATIONS

Xi, Modification of Wyoming Montmorillonite Surfaces Using a Cationic Surfactant, Jul. 5, 2005, American Chemical Society, U.S.A.

Kooli, Effect of the Acid Activation Levels of Montmorillonite Clay on the Cetyltrimethylammonium cations Adsorption, Jul. 6, 2005, American Chemical Society, U.S.A.

Nzengung, Phytoremediation of Petrochemicals, perchlorate, and Chlorinated Solvents in Soil and Groundwater, Jul. 24, 2005, INCEED2005, U.S.A.

* cited by examiner

Tetramethylammonium (TMA)

Trimethylphenylammonium (TMPA)

Hexadecyltrimethylammonium (HDTMA)

Benzyldimethyltetradecylammonium (BDTDA)

TREATMENT OF PERCHLORATE AND OTHER EMERGING CONTAMINANTS IN WATER AND BRINES

CLAIM TO PRIORITY

Applicant hereby claims priority under all rights to which he is entitled under the benefit under 35 USC 119(e) based upon the U.S. Provisional Application Ser. No. 60/627,683 for this patent application filed at the United States Patent and Trademark Office on Nov. 15, 2004, which is hereby incorporated by reference in its entirety.

FIELD OF THE INVENTION

The present invention relates to the field of tailored earth materials. In particular, the present invention relates to surfactant-modified earth materials for the treatment of emerging contaminants in water, e.g., perchlorate, N-Nitrosodimethylamine (NDMA), 1,4-Dioxane.

BACKGROUND OF THE INVENTION

Energetic and propellant materials, including perchlorate, explosive components, and their breakdown products are contaminants of concern to the Department of Defense (DoD). The emergent contaminants perchlorate, 1,4-dioxane, and N-nitrosodimethylamine are highly soluble, potentially hazardous and recalcitrant propellant and energetic contaminants. The important properties of perchlorate salts (ammonium, potassium, magnesium, and sodium) include:
   solubility of its salts in aqueous solution and organic solvents
   stability in aqueous solution
   non-volatility.
These physicochemical properties contribute to the large perchlorate plumes in aquifers that supply drinking water.

Perchlorate has contaminated surface and groundwater resources at various locations in the United States. Most of the perchlorate manufactured in the United States is used as the primary ingredient of solid rocket fuel for military missiles and the space shuttle, although it has also been used in fireworks, safety flared, matches and car air bags. Manufacturing, testing, and training operations have released perchlorate into the environment where it has contaminated soil, groundwater, and surface water. Wastes from the manufacture and improper disposal of perchlorate-containing chemicals are increasingly being discovered in soil and water.

Perchlorate is both a naturally occurring and man-made chemical that impacts human health by interfering with the functioning of the thyroid gland. The thyroid regulates metabolism in adults and proper development in children. Thyroid gland tumors have been linked to perchlorate exposure. As a potential endocrine disrupter, perchlorate can threaten the health of both human and wildlife populations.

NDMA, a probable human carcinogen, is produced by the oxidation of 1,1-dimethylhydrazine (UDMH) which is mainly used in rocket fuel production. NDMA is a yellow oily liquid that is semi-volatile, very soluble in water and highly mobile in soil. Due to the physical and chemical properties of NDMA, conventional physical and chemical treatment processes have been either expensive or ineffective. Both perchlorate and NDMA have been identified as co-contaminants in DoD wastewater.

1,4-Dioxane is used as a stabilizer of solvents such as 1,1,1-trichloroethane, and often remains as a residual contaminant following remediation of the highly volatile solvent. 1,4-dioxane is more soluble than the compounds with which it is released, resulting in rapidly expanding groundwater plumes.

There is currently a lack of sustainable cost-effective remediation technologies to address the widespread perchlorate contamination of water resources. The cost of treating perchlorate and other emergent contaminants in water using existing technologies (ion exchange and granular activated carbon) is a growing financial burden. This is because perchlorate is a highly soluble anion with poor affinity for most sorbents used in conventional water treatment. The relative adsorption of perchlorate to other anions in water is given by: $HCrO_4^- > Cr_4^{2-} > ClO_4^- > SeO_4^{2-} > SO_4^{2-} > NO_3^- > Br^- > (HPO_4^{2-}, HAsO_4^{2-}, SeO_3^{2-}, CO_3^{2-}) > C^- > NO_2^- > Cl^- > (H_2PO_4^-, H_2AsO_4^-, HCO_3^-) > OH^- > CH3COO^- > F^-$.

Additionally, although ion exchange is a reliable, proven technology for perchlorate removal from water sources, treatment and disposal of the resulting concentrate is the limiting factor in successfully applying this technology at some water utilities. Treatment of perchlorate-contaminated water using ion exchange processes, reverse osmosis, and nanofiltration all generate a large volume of perchlorate-rich waste brines that may be difficult to dispose. Further treatment of the brine is needed to reduce its volume or toxicity before disposal. Initial studies in this area have identified biological degradation as a promising technique to accomplish this goal. However, reuse of treated ion exchange brine has an adverse impact on distribution system water quality. Microorganisms used for perchlorate/nitrate destruction in the concentrate could possibly grow on ion exchange resins, with potential of getting into the effluent and distribution system. The American Water Works Research Foundation (AWWAR) and the United States Environmental protection Agency (EPA) have been seeking low-cost sustainable technologies for treatment of perchlorate-rich waste brines.

Granular activated carbon (GAC) is not a good sorbent for the highly soluble solutes, i.e. emergent contaminants. Tailored GAC may be good sorbents but are more expensive than the low-cost tailored clays, due to capital cost and treatment of the regenerant.

The cost of treating perchlorate and other emergent contaminants in water using existing technologies (ion exchange and granular activated carbon) is a growing financial burden.

These and other problems exist. Previous attempts to solve these and other problems include the following.

In many municipal water districts, Amberlite PWA2 resin and other ion selective resins are used to manage perchlorate contamination concerns. Specific approaches include:
   Resins—regenerable and non-regenerable selective ion exchange resins
   GAC and tailored GAC
   Nanofiltration materials
   Chemical destruction of the contaminants (compounds)
   Biological degradation of the contaminants in fluidized bed and packed bed reactors, and injection of electron sources into the contaminated water to enhance biodegradation of perchlorate.

U.S. Pat. No. 4,740,488, issued to Fogler et al. on Apr. 26, 1988, discloses a modified clay that is a general purpose sorbent for the removal of trace organic pollutants from process effluent streams. An expandable smectite clay, such as montmorillonite, is placed in an aqueous suspension to expand the layers. The expanded clay is then treated with an excess of a solution of hydroxy-aluminum, in particular, a hydroxy-aluminum solution having an $OH^-/Al$ ratio of about 2.54 and a pH in the vicinity of 4.5. The weight of clay to volume of hydroxy-aluminum solution may vary from about 1:10 and 1:25. The treated clay is filtered, washed, dried, and powdered, and then the entire treatment sequence is repeated. The modified, powdered clay removes organic pollutants from industrial effluent in the ppb-ppt range. In particular, the modified clay is useful in removing traces of PCBs and Dioxin.

U.S. Pat. No. 4,916,095, issued to Fogler et al. on Apr. 10, 1990, discloses a modified clay sorbent and method of treating industrial effluents to remove trace pollutants, such as dioxins, biphenyls, and polyaromatics such as benzo(a)pyrene and pentachlorophenol. The clay sorbent has a composite structure in which the interlayer space of an expandable clay, such as smectite, is filled with polyvalent or multivalent inorganic cations which forces weaker surfactant cations to locate on the surface of the clay in such an orientation that the resulting composite is hydrophobic in nature. In certain embodiments, a non-expanding clay, such as kaolinite, is used and surfactant cations are necessarily located on an external surface of the clay.

While these patents and other previous methods have attempted to solve the above mentioned problems, none have utilized or disclosed cost-effective, tailored, earth materials that filter perchlorate and emergent contaminants from freshwater and brines and that are degraded using bioremediation processes, as does the present invention.

Therefore, a need exists for tailored earth materials with these attributes and functionalities. The tailored earth materials according to the present invention substantially depart from the conventional concepts and designs of the prior art. It can be appreciated that there exists a continuing need for new and improved tailored earth materials which can be used commercially. In this regard, the present invention substantially fulfills these objectives.

The foregoing patent and other information reflect the state of the art of which the inventor is aware and are tendered with a view toward discharging the inventor's acknowledged duty of candor in disclosing information that may be pertinent to the patentability of the present invention. It is respectfully stipulated, however, that the foregoing patent and other information do not teach or render obvious, singly or when considered in combination, the inventor's claimed invention.

BRIEF SUMMARY OF THE INVENTION

The general purpose of the present invention, which will be described subsequently in greater detail, is to provide a tailored sorbent. In particular, the present invention relates to tailored earth materials that treat (filter) emergent contaminants from water or brine.

The general product by process steps involved for making the present invention are as follows:
  Obtain the mined clays and zeolites
  Pelletize the clays and zeolites if 10-60 mesh size needed in application
  Obtain the right type of cationic surfactants
  Determine the concentration of surfactant solution needed to treat the clays—based on cation exchange capacity (CEC) of the solids (clay, zeolite, soil).
  Treat the clays (ion exchange) to obtain the tailored materials
  Wash off the excess salts
  Dry the washed tailored sorbents
  The product is ready for use as sorbent In accordance with a method aspect of the present invention, tailored earth materials for treating emerging contaminants are made in accordance with the process steps set forth hereinabove with respect to the product by process aspect of the invention.

In accordance with a use aspect of the present invention, applications may include pre-filtration of perchlorate-contaminated water to reduce the cost of GAC and resins and for in-situ tailored clay permeable sorption barriers. Prior to disposal, the spent tailored clay is easily treated using bioremediation.

Further in accordance with a use aspect of the present invention, the spent organoclay may be treated prior to disposal by providing suitable nutrient amendments, electron sources, and/or perchlorate degrading bacteria to stimulate biodegradation of the sorbed perchlorate. Since huge deposits of the raw natural clays used to prepare surfactant modified clays (SMC) are available widely worldwide, use of SMCs should significantly reduce the cost of treating large volumes of perchlorate-contaminated water.

The present invention provides a sustainable solution to the growing scarcity of clean water, by providing surfactant-modified (or tailored) clays (SMC) and surfactant-modified zeolites (SMZ) for the sustained low-cost treatment of perchlorate and other emerging contaminants in water. These sorbents are prepared from abundant, low-cost, natural clays and zeolites by replacing exchangeable metal cations in these mineral deposits with cationic surfactants similar to those used in many commercial products including hair conditioner and mouthwash.

The present invention is effective as sorbents for organic contaminants and metals dissolved in water. The present invention adsorbs organics as well as negatively-charged inorganic contaminants (e.g., perchlorate, nitrate, chromate, arsenate, sulfate), while retaining most of the ability to adsorb positively-charged inorganics. Therefore, the present invention is effective as adsorbents of all the major classes of groundwater contaminants. The present invention includes bioremediation steps that eliminate high disposal costs.

The most common natural zeolite is clinoptilolite with the simplified formula $(Na,K)_6Si_{30}Al_6O_{72}.nH_2O$ found mainly in sedimentary rocks of volcanic origin. Such deposits have aroused strong commercial interest because clinoptilolite tuffs are often rather pure and can be mined with simple techniques. Characteristic clinoptilolite rocks consist of 60-90% clinoptilolite with the remaining being mainly feldspars, clays, glass, and quartz.

Tailored earth materials, e.g. clays, soils, and zeolite, have multiple applications in the treatment of perchlorate-contaminated water, including:
  Filtration media to remove perchlorate and all the major groups of water contaminants from contaminated water
  Sorbent for treatment of agriculture irrigation and industrial wastewater containing perchlorate, other emergent and co-contaminants
  Filtration media to treat perchlorate-, NDMA-, 1,4-dioxane-contaminated brines and wastewaters
  Point of use filtration media in units installed in homes and at wellhead
  Sorption media used in sorption barrier and permeable reactive barriers (PRB)
  Pretreatment of the influent to the more expensive selective ion exchange resins, GAC filters, reverse osmosis units, ultra filtration units, and other related systems. When used upstream from GAC and resins, the surfactant modified materials (SMM) optimize the overall system performance and reduce costs
  Sorption media to remove perchlorate and other emerging contaminants from brackish and salt water (brines)

The surfaces of many earth materials, e.g., clays, minerals, soils, and zeolites, can be modified using surfactants. This renders the organo-modified (tailored) solids effective as sorbents of organic and inorganic contaminants. The present invention focuses on the removal of water miscible emergent contaminants, e.g., perchlorate, NDMA, 1,4-dioxane, etc., from aqueous media using tailored clay minerals, soils, and zeolites. Surfactant-modified treatment of clays minerals and clinoptilolite, produces new nanophases (nanomaterials) of tailored solids with the potential to remove organic and inorganic impurities from aqueous media, including perchlorate and other water miscible emerging water pollutants. Prior to disposal, degradable compounds sorbed onto the spent filtration material are degraded using bioremediation processes (composting, bio-augmentation, or intrinsic bioremediation) to avoid liability from the leaching of the sorbed compounds.

The influences on the process or organoclay preparation may include:
  CEC of the clay
  the concentration surfactant used
  the type of surfactant
  temperature
  sonication
  rate and concentration of surfactant mixing with the clay slurry
  washing solvent
  acid treatment of clay
  type of exchangeable cations on clay
  types of clay, soil, sediment or zeolites.

The adsorbed surfactant morphology determines both the kinetics of adsorption and the surface excess. The acid activation of montmorillonites causes a reduction in the number of cation exchange sites and, leads to an increase in the basal spacing. This may be needed in some cases to increase the inter-lamellar spaces for sorption of large sized compounds. Although the exchange of surfactants with exchangeable cations of clays may be enhanced by increasing the reaction temperatures, at temperatures above 300° C., the decomposition of the surfactant occurs and the basal spacing decreases.

There are three different molecular configurations for surfactant placement in organoclays:
  electrostatic interaction due to cation exchange resulting in surfactant cations intercalated in the clay interlayers and surface sites
  physically adsorption of the surfactant cations and/or molecules on the external surface of clay
  excess surfactant molecules located within the clay interlayer by hydrophobic-hydrophobic and/or hydrophobic-hydrophilic interactions.

The organoclays prepared at low surfactant concentration has better thermal stability than those prepared at high surfactant concentration, and their thermal stability strongly depends on the surfactant adsorbed on external surfaces of the clay. Meanwhile, there are more surfactant cations electrostatically bound to the montmorillonite interlayer surface in the samples prepared by the ultrasonic method than those prepared by the hydrothermal method. The excess surfactants may be washed off using organic cosolvents, for example ethanol and water.

Cationic surfactants or quaternary ammonium cations (QUATs) of the general form [(CH3)3NR+] or [(CH3)2NRR'+], where R and R' are aromatic or alkyl groups. Some of the commonly used cationic surfactants for preparation of sorbents include:

BDTDA (Benzyldimethyltetradecylammonium): Number of carbons=C-22
DDTMA (Dodecyltrimethylammonium): Number of carbons=C-15
DODMA (Dioctadecyldimethylammonium): Number of carbons=C-18
HDTMA (Hexadecyltrimethylammonium): Number of carbons=C-19
ODTMA (Octadecyltrimethylammonium bromide): Number of carbons=
TDTMA (Tetradecyltrimethylammonium): Number of carbons=C-17
TMA (Tetramethylammonium): Number of carbons=C-4
TMPA (Trimethylphenylammonium): Number of carbons=C-9

The hydrocarbon chain length of surfactant molecules has a significant effect on the ion exchange as well as hydrophobic interaction mechanisms. The effectiveness of both ion exchange and hydrophobic interactions increases with increasing chain length, and so the greatest surfactant adsorption onto clays and clinoptilolite influenced the selection of HDTMA and BDTDA and similar quaternary ammonium salts.

One embodiment of the present invention involves pelletized (agglomerated, granular) surfactant modified clay and zeolite. The clay or clinoptilolite & bentonite, or clinoptilolite pellets were prepared from the original fine grained raw materials in one of two ways:
  by bonding the desired raw nanoparticles with sodium aluminosilcate or similar binders used in the industry
  by thermally (heat) treating the nanoparticles to above 400 C.
  Using some combination of the above.

The pellets produced may be of varying mesh sizes depending on the desired application. Granular or powdered organoclays can be used in various reactor configurations including completely stirred tank reactors, packed beds, and sorption barriers to treat perchlorate-contaminated water.

In an embodiment of the present invention, the tailored sorbents are prepared using a modification of exiting protocols to treat the earth material. For clays and zeolite, the clay fraction was obtained by standard dispersion and sedimentation methods. Depending of the type of clay, the clay is calcium saturated to improve handling of smectite clays. Washing with water removes excess salts. The Ca-clay, clays, zeolite, or soils are converted to tailored sorbents by ion exchange with aqueous solutions of the desired quaternary ammonium salts. The nitrogen end of the quaternary amines, the hydrophilic end, is positively charged and ion exchanges onto the clay platelet for the exchangeable cations, e.g. sodium, calcium, etc. The optimum dose of each quaternary ammonium salt is determined based on the cation exchange capacity (CEC) of the starting materials/solids, the type of cationic surfactant, and the amount of loading desired. At the end of the exchange process, the tailored or surfactant modified solid is separated by centrifugation and/or filtration, washed of excess salts and dried. The dried tailored material is then ready for use in the treatment of contaminated water.

In yet another embodiment of the present invention the clay and surfactant mixtures are stirred for the desired period of time at a selected temperature using an ultrasonics sonifier with an output of about 40 mW. A minimum of 30 minutes may be desired for reactions at room temperature under sonification. Unlike the thermal method of producing organoclays, using the ultrasonic preparation method results in a higher surfactant concentration within the clay interlayer.

One advantage of the present invention is that it is made from natural commonly available earth materials.

Another advantage of the present invention is that is a cost-effective alternative to existing methods.

Another advantage of the present invention is the availability of a process to destroy the sorbed degradable contaminants in the spent media, thus providing a life-cycle approach to avoid liability and cost of disposal of the spent filtration media.

Another advantage of the present invention is that selected cationic surfactants of specific characteristics have been identified.

Another advantage of the present invention is that it filters perchlorate and emergent contaminants from both freshwater and wastewater, including brines.

Another advantage of the present invention is that it provides ultra-selective sorbents that achieve the highest loading (removal) capacity for perchlorate versus other products.

Another advantage of the present invention is that it can be used to treat both potable and non-potable water.

Another advantage of the present invention is that it underpins functional applications of clays and zeolite nanocomposites for:
- the uptake of toxins of specific sizes
- the insertion of photoreactive agents
- their use as chemical sensors or carriers
- their use as catalysts or supports There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further objects and advantages of the present invention will be apparent from the following detailed description of a presently preferred embodiment which is illustrated schematically in the accompanying drawings.

BRIEF DESCRIPTION OF THE SEVERAL VIEWS OF THE DRAWINGS

Other advantages and features of the invention are described with reference to exemplary embodiments, which are intended to explain and not to limit the invention, and are illustrated in the drawings in which.

DETAILED DESCRIPTION OF THE INVENTION

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
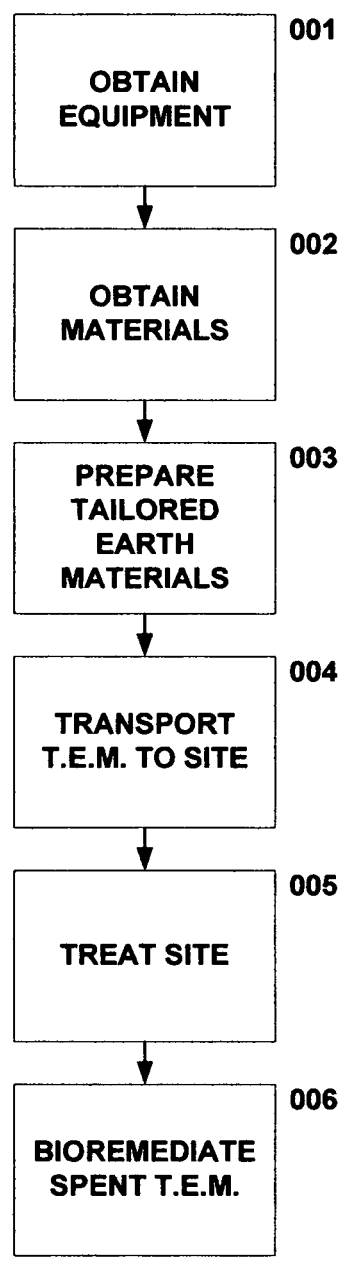
FIG. 1 illustrates an overview of the steps to make and use tailored earth materials, according to an embodiment of the present invention.

Referring now to FIG. 1, in step 001 the necessary equipment is obtained, based on the type of earth material and the selection of method of preparation. In step 002, the earth materials and solutions are obtained, based on the type of earth material and the selection of method of preparation. In step 003, the earth materials are prepared, based on the method of preparation and the emerging contaminants targeted. In step 004, the tailored earth materials (T.E.M) are transported to the contaminated site. In step 005, the site is treated with the tailored earth materials. In step 006, the spent tailored earth materials are degraded using bioremediation.

Figure 2:
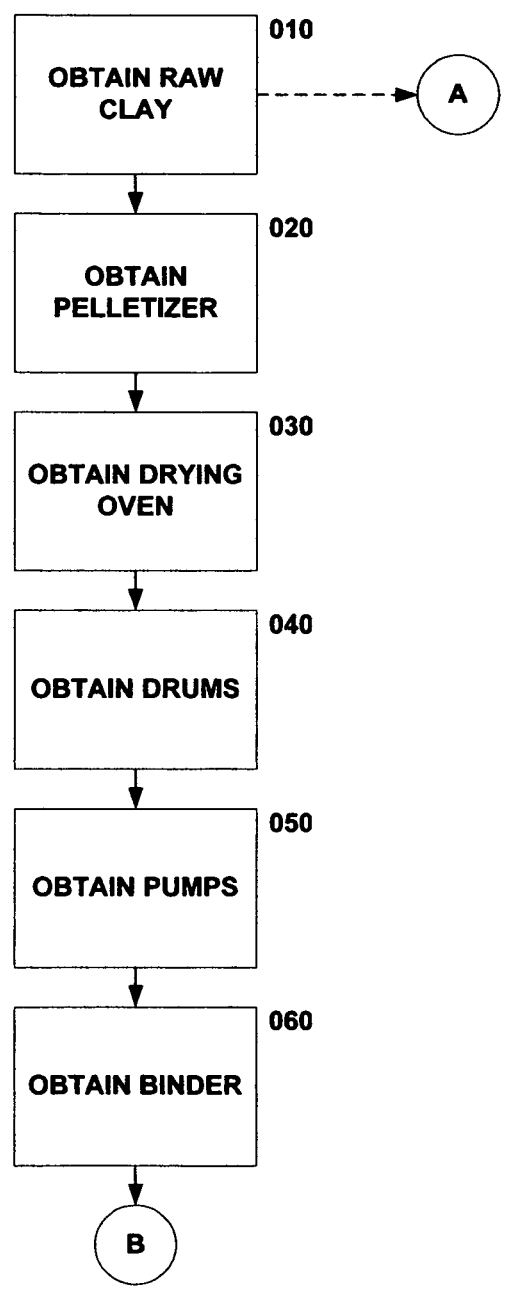
FIG. 2 illustrates the steps to prepare for making tailored earth materials, according to an embodiment of the present invention.

Referring now to FIG. 2, further detail is shown for one embodiment of the present invention for obtaining the equipment and materials for preparation of a binder process of creating pelletized, i.e., granular or agglomerated, surfactant modified clays and earth materials, which are preferred if the tailored earth materials will be used in filtration beds requiring high permeability. In step 010 raw clay or zeolite, e.g. clinoptilolite, etc., is obtained. If the raw clay is a type of swelling clay that is difficult to process are involved, additional steps are needed, as is indicated by connector A. In step 020 a pelletizer, e.g. a rotating disk pelletizer, lab pelletizer, etc., is obtained. In step 030 a drying over is obtained. In step 040 drums are obtained. In step 050 pumps are obtained and in step 060 a suitable binder, e.g. sodium aluminosilicate, is obtained. The additional steps needed to prepare the tailored earths for this embodiment are indicated by connector B.

Figure 3:
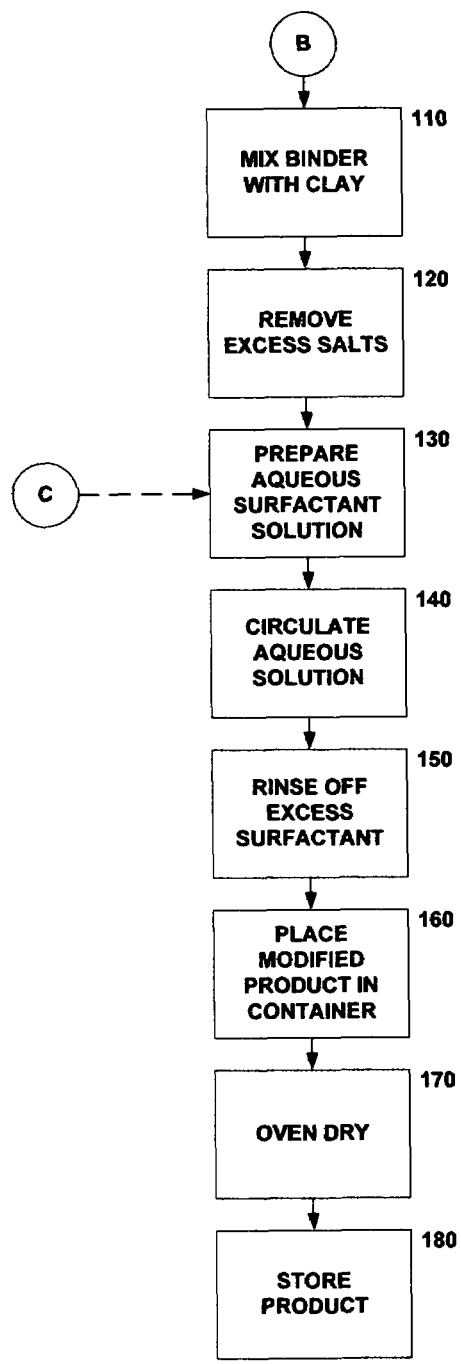
FIG. 3 illustrates the steps to make tailored earth materials, according to an embodiment of the present invention.
Figure 4:
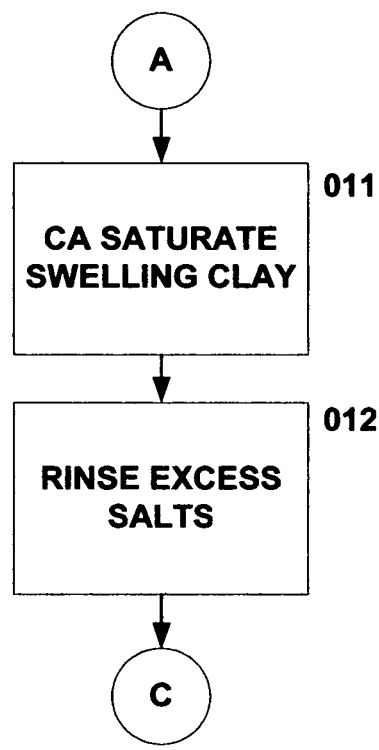
FIG. 4 illustrates additional steps to make tailored earth materials, depending on the nature of the raw earth material, according to an embodiment of the present invention.

Referring now to FIG. 3 and FIG. 4, connector B is shown to continue the process in FIG. 2. In step 110, the binder is mixed with the clay in the pelletizer to obtain the desired ~10 to 60 mesh size (~0.2 to 2 mm) aggregate particle size formable from particle sizes of 1 μm to 1 mm. In step 120, the excess salts are removed by rinsing with clean freshwater. In step 130, a solution of aqueous surfactant equal to or less than the CEC of the raw clays/zeolite is prepared. The amount of surfactant used for high loading is equal to the CEC of the earth materials. Connector C from FIG. 4 is shown to indicate the process when a swelling type of clay is Calcium saturated in step 011 and then rinsed of excess salts in step 012. If a swelling type of clay is not used, these steps are omitted. In step 140 the aqueous solution is circulated through the pre-fabricated palletized solids container in an up-flow mode until a constant sodium content is measured in the surfactant-water drum; an indication that the exchange is complete. Once the pellets are surfactant modified, in step 150, rinse the excess surfactant from the pellets until the rinsate shows the absence of excess surfactants. In step 160 the tailored earth is placed in a container. In step 170, the tailored earth is oven dried at 110° F. overnight. In step 180, the ready-to-be-used tailored earth is stored awaiting transport to the site of use or distributor.

Figure 5:
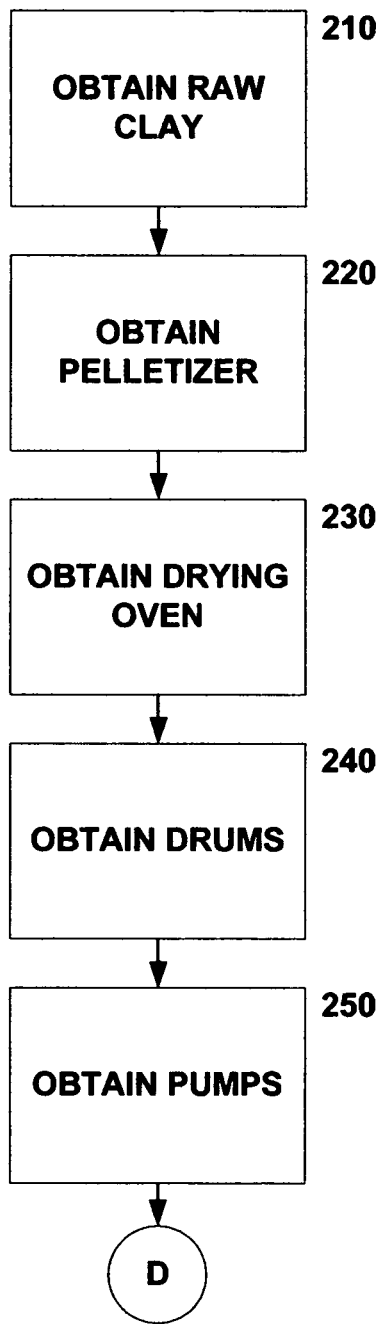
FIG. 5 illustrates the steps to prepare to make tailored earth materials, according to an embodiment of the present invention.

Referring now to FIG. 5, preparation for utilizing a thermal process for creating pellets of tailored earths is illustrated. In step 210, the raw clay is obtained. In step 220, the pelletizer is obtained. In step 230 the drying oven is obtained. In step 240 the drums are obtained. In step 250 the pumps are obtained. The additional steps needed to prepare the tailored earths for this embodiment are indicated by connector D.

Figure 6:
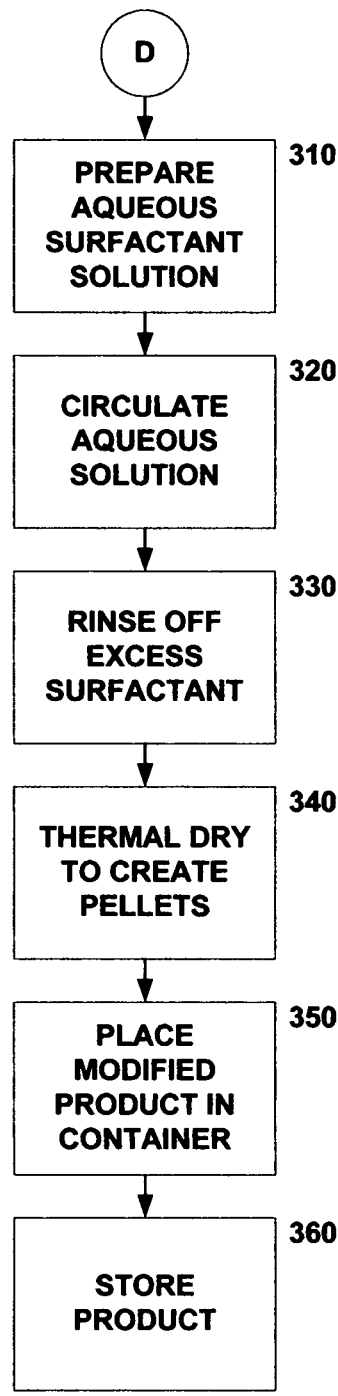
FIG. 6 illustrates the steps to make tailored earth materials, according to an embodiment of the present invention.

Referring now to FIG. 6, connector D is shown to continue the process in FIG. 5. In step 310, pellets are created by using a thermal process. The clay must be heated to above 400° C. and preferably at 500° C. to obtain pellets. In step 320, the aqueous surfactant solution is prepared. In step 330, the aqueous solution is circulated. In step 340 the excess surfactant is rinsed off. In step 350, the tailored earths are placed into a container. In step 360 the ready-to-be-used tailored earth is stored awaiting transport to a contaminated site.

A combination of the thermal and binder processes may also be used to prepare the agglomerates or pellets that are stable in water. The exchange process may be performed in the batch or dynamic flow-through column mode. The art of pelletizing clays (preparing clay agglomerates) using selected binders is known in the industry.

Figure 7:
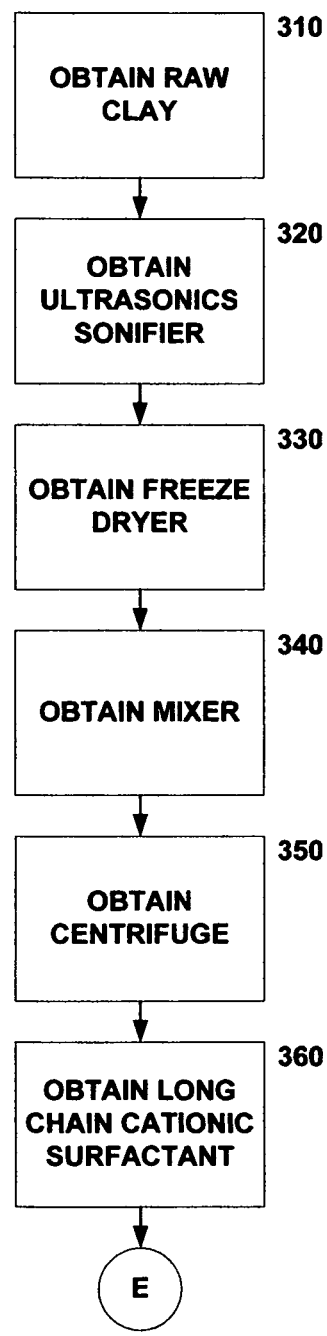
FIG. 7 illustrates the steps to prepare to make tailored earth materials, according to an embodiment of the present invention.

Referring now to FIG. 7, preparation for using powdered surfactant modified clays is illustrated. In step 310 the raw clay is obtained. In step 320, an ultrasonics sonifer is obtained with an output of about 40 mW. In step 330 a freeze dryer is obtained. In step 340 a mixer is obtained. In step 350 a centrifuge is obtained. In step 360 a long chain cationic surfactant is obtained. The additional steps needed to prepare the tailored earths for this embodiment are indicated by connector E.

Figure 8:
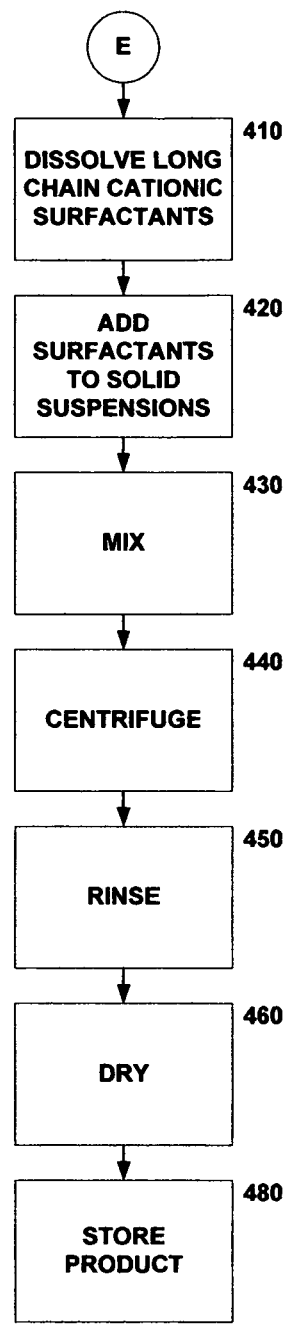
FIG. 8 illustrates the steps to make tailored earth materials, according to an embodiment of the present invention.

Referring now to FIG. 8, connector E is shown to continue the process in FIG. 7. In step 410, the cationic surfactant (long chain quaternary ammonium salt) is dissolved in warm de-ionized water. The amount of long chain cationic surfactants is equivalent to 0.02 to 1 times the CEC of the clay or desired earth material. (If short-chain quaternary ammonium salts are used, the concentration of surfactant needs to be in 3 to 5 times the CEC of the clays or earth material.) Long-chained cationic surfactant modified clays, also known as tailored clays or organoclays, are effective in removing perchlorate from water and stabilization of soils contaminated with per-chlorate. In step 420, the surfactant is added to the solid suspensions. In step 430 the organo-modified earth material suspensions are mixed for 12-24 hours. In step 440, the organo-modified earth material suspensions are centrifuged. In step 450 the tailored earths are washed gently with de-ionized water until no excess salt is detected in the rinsate. In step 460, the tailored earths are dried in a freeze drier or under heat at <150° C., above which the organic phase might begin to transform. In step 480, the ready-to-be-used tailored earths are stored awaiting transport to the client or point of use. The kinetics of this exchange process can be improved by mixing the aqueous solution of surfactant and earth material at higher than room temperature (40° to 60° C.) and sonication. The clay and surfactant mixtures are stirred for the desired period of time at 60 degrees C. using an ultrasoncs sonifer with an output of about 40 mW. A minimum of 30 minutes may be desired for reactions at room temperature under sonification. Unlike the thermal method of producing organoclays, the use of the ultrasonic preparation method results in a higher surfactant concentration within the clay interlayer.

If the intent is to increase the basal spacing (clay inter-layer), the acid activation of montmorillonites causes a reduction in the number of cation exchange sites and leads to an increase in the basal spacing. This may be needed in some cases to increase the inter-lamellar spaces for sorption of large sized ions or compounds. Although the exchange of surfactants with exchangeable cations of clays may be enhanced by increasing the reaction temperatures, at temperatures above 300° C., the decomposition of the surfactant occurs and the basal spacing decreases. If excess cationic surfactants and halogen anions are not washed off the clay minerals during rinsing, the resultant organo-modified earth material has a reduced thermal stability.

Figure 9:
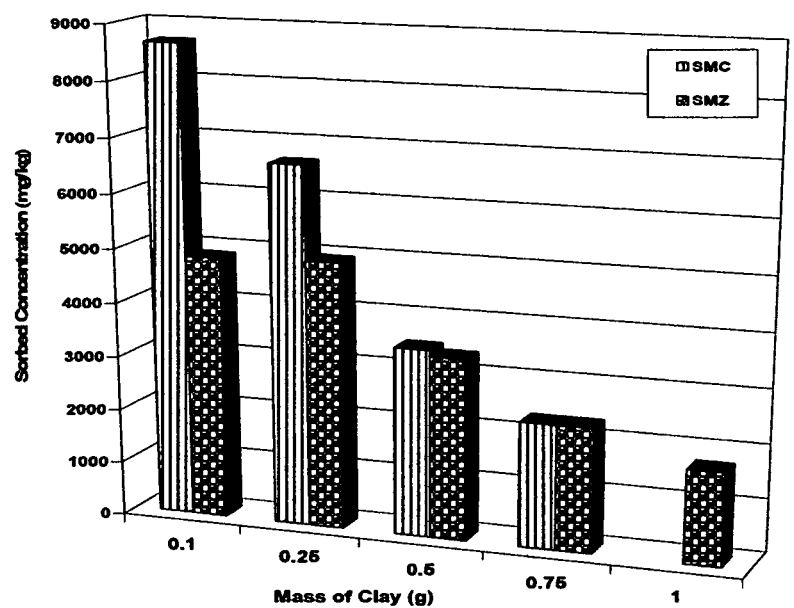
FIG. 9 illustrates mass of perchlorate sorbed as a function of mass of clay.

Referring now to FIG. 9, the mass of perchlorate sorbed as a function of mass of clay (0.1-1.0 gram) in 35 ml of aqueous solution of 50 mg/l perchlorate ($ClO_4^-$) is shown, based on sorption isotherm experiments to determine optimization of mass of clay.

Figure 10:
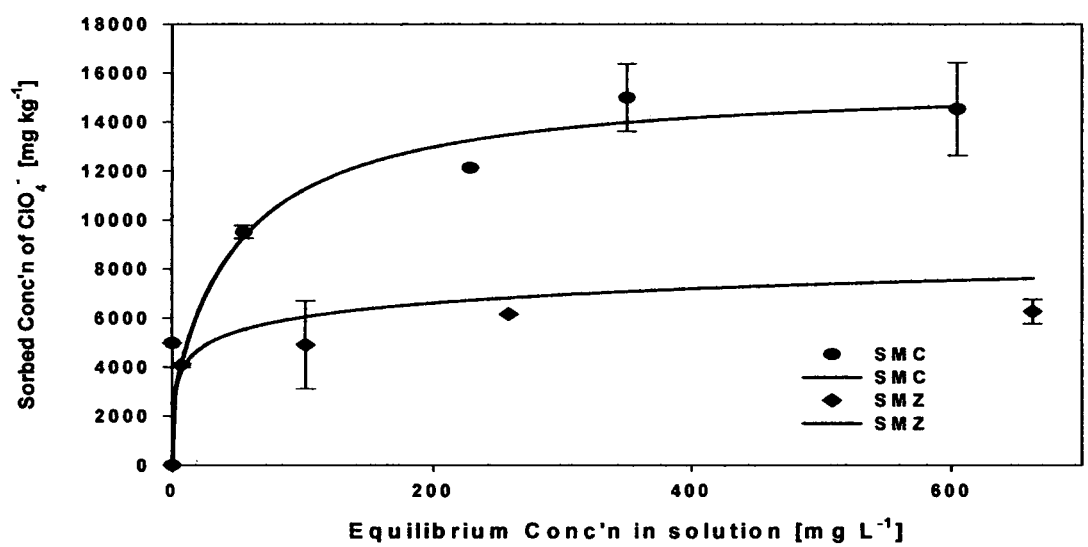
FIG. 10 illustrates the relative effectiveness of powdered form of tailored clay versus granular tailored zeolite in the treatment of perchlorate-contaminated freshwater.

Referring now to FIG. 10, the relative effectiveness of powdered form of the tailored clay (circle) vs. tailored zeolite agglomerates (diamond) in treatment of perchlorate-contaminated freshwater is shown.

Figure 11:
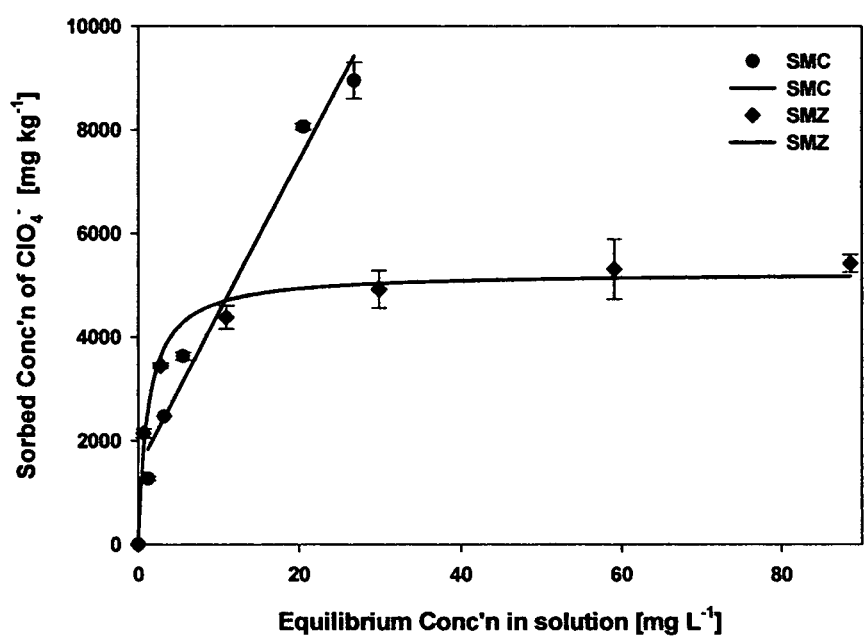
FIG. 11 illustrates the effectiveness of tailored clay (powdered form) and granular tailored zeolite for treating perchlorate-contaminated brine.

Referring now to FIG. 11, the effectiveness of powdered form of tailored clay (circle) and tailored zeolite agglomerates (diamond) for treating perchlorate-contaminated brine is shown.

Figure 12:
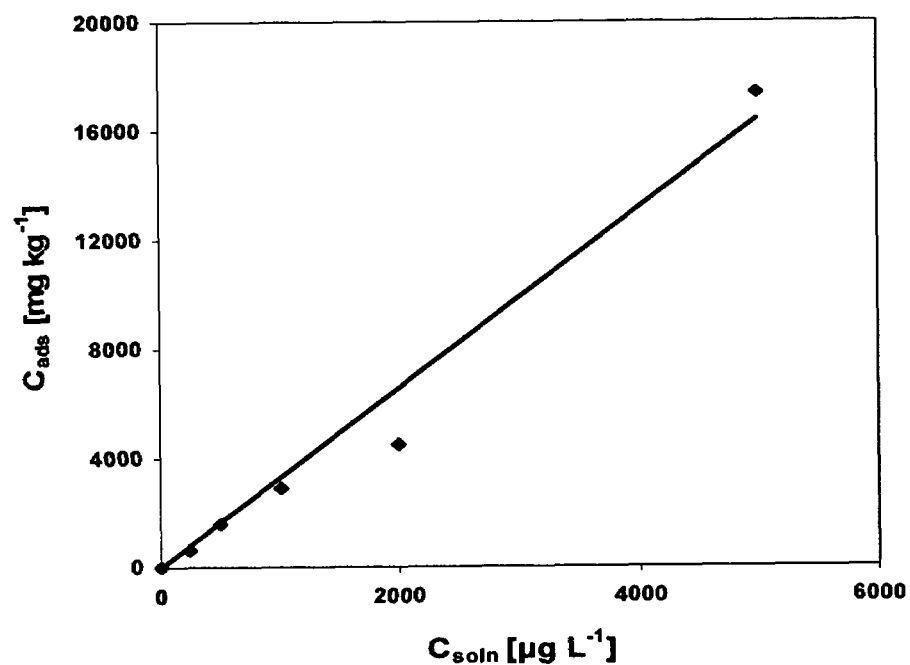
FIG. 12 illustrates the sorption of NDMA by tailored clay.

Referring now to FIG. 12, the Sorption of NDMA by tailored clay is shown where $C_{ads}$ is the sorbed concentration expressed in mass/mass basis and $C_{soln}$ is the concentration measured in solution at equilibrium.

Figure 13:
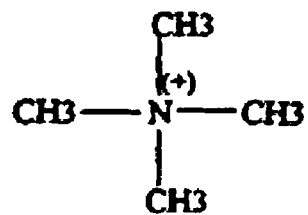
FIG. 13 illustrates the chemical structures of selected quaternary ammonium salts (cationic surfactants) used in preparation of the probe organo-clays.
Figure 13:
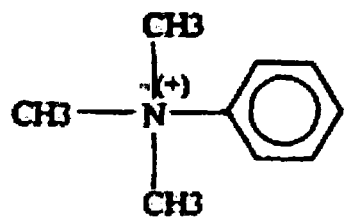
Figure 13:
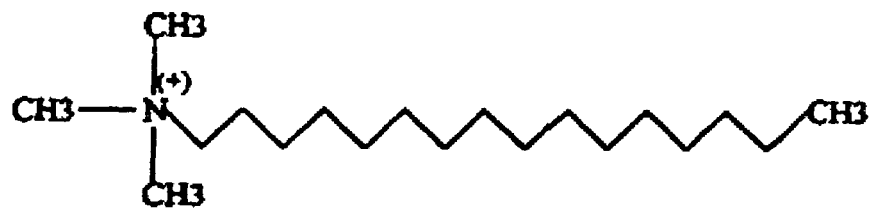
Figure 13:
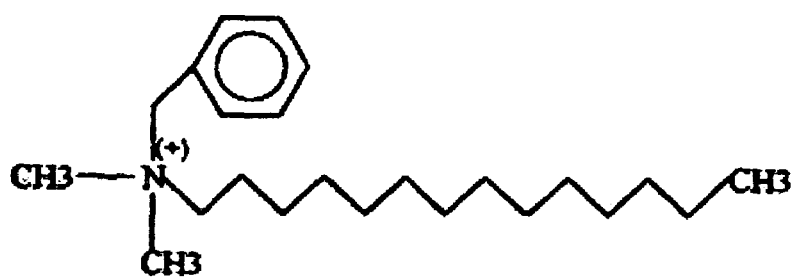

Referring now to FIG. 13, the chemical structures of the quaternary ammonium salts (cationic surfactants) used in the preparation of the probe organoclays is shown. Other quaternary ammonium salts other that shown in FIG. 13 may work equally well or better as surfactants for preparation of organoclays with very high sorption capacity for treating perchlorate-contaminated water and soil.

Figure 14:
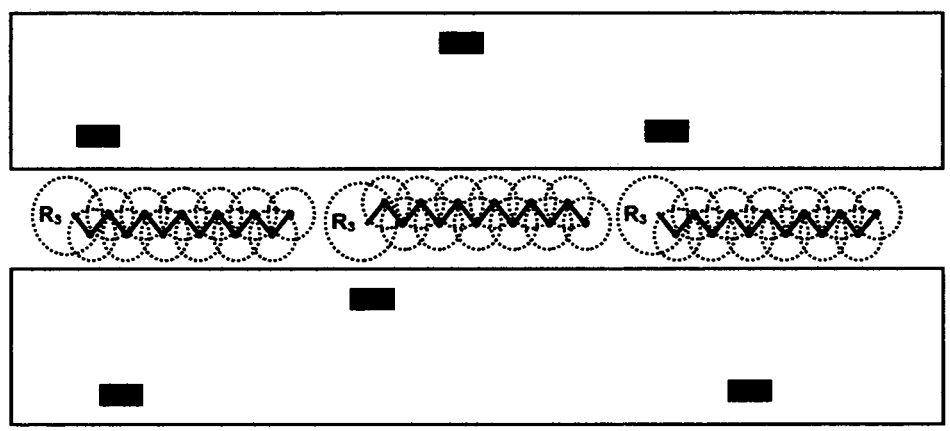
FIG. 14 illustrates a low charge clay monolayer.

Referring now to FIG. 14, a low-charge clay, monolayer of surfactant intercalated after surfactant modification.

Figure 15:
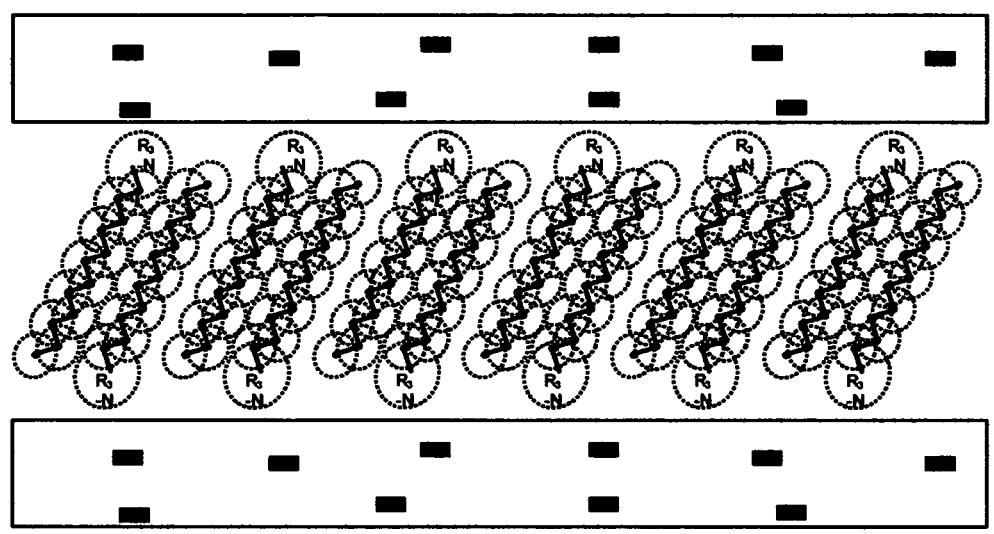
FIG. 15 illustrates a high-charge clay, paraffin type packing.

Referring now to FIG. 15, a high-charge lay, paraffin type packing of cationic surfactants, is shown after surfactant modification.

Results of kinetic tests suggest that sorption equilibrium is achieved in about two hours with the fine particle size (powdered) surfactant modified materials (SMM) or TEM; however, it is recognized that the kinetics may be slower with the larger size agglomerates desired for used in water filtration.

For example, sorption equilibrium was achieved in four hours in sorption kinetic experiments conducted with pelletized SMZ. The sorption capacity of the tailored clays varies from 6,000 mg/kg at low perchlorate loading to 15,000 mg/kg at high loading in freshwater (FIGS. 1 & 2) in the latter experiments where sorption was described by the Langmuir model. The highest sorption coefficient estimated for the most efficient SMC tested is 11 L/kg ($R^2$=0.99) for the range of perchlorate concentration (50-750 mg/l) and ratio of clay mass to solution tested.

What is claimed is:

1. A method for bioremediation of a spent organoclay composition containing brines, at least one of an organoclay, at least one of a cationic surfactant and at least one of a sorbed contaminant comprising:
    providing at least one of a nutrient amendment;
    providing at least one of an electron donor source; and
    providing at least one of a contaminant degrading bacteria to stimulate biodegradation of the sorbed contaminant.

2. The method of claim 1, wherein said sorbed contaminant is a bio-degradable compound and said contaminant degrading bacteria is a perchlorate degrading bacteria.

3. The method of claim 1, wherein said sorbed contaminant is perchlorate.

4. The method of claim 1, wherein said sorbed contaminant is 1,4-dioxane.

5. The method of claim 1, wherein said sorbed contaminant is n-nitrosodimethylamine.

* * * * *